United States Patent [19]

Masta

[11] 4,077,372
[45] Mar. 7, 1978

[54] SPARK TIMING CONTROL SYSTEM FOR AN INTERNAL COMBUSTION ENGINE

[75] Inventor: Robert I. Masta, Ann Arbor, Mich.

[73] Assignee: General Motors Corporation, Detroit, Mich.

[21] Appl. No.: 761,694

[22] Filed: Jan. 24, 1977

[51] Int. Cl.² .............................................. F02P 5/04
[52] U.S. Cl. ............................ 123/117 D; 123/117 R
[58] Field of Search ........................ 123/117 R, 117 D

[56] References Cited

U.S. PATENT DOCUMENTS

| 3,756,212 | 9/1973 | Schirmer et al. | 123/117 R |
| 3,972,310 | 8/1976 | Gambill | 123/117 R |
| 3,990,417 | 11/1976 | Tershak | 123/117 R |
| 4,003,354 | 1/1977 | Canup | 123/117 R |

*Primary Examiner*—Ronald B. Cox
*Attorney, Agent, or Firm*—C. R. Meland

[57] ABSTRACT

A spark timing control system for an internal combustion engine. The spark timing of the engine is controlled by a signal generating device driven in synchronism with the engine which develops signals that represent engine crankshaft position. The signal generating device has mechanisms for phase shifting the signal as a function of engine speed and engine manifold vacuum. The system includes a spark timing controller connected to the signal generating device which is capable of retarding spark timing from that set by the signal generating device in a plurality of crankshaft angle steps. The ignition timing provided by the spark timing controller is controlled by an electronic spark selection device which responds to engine operating parameters such as engine speed, engine manifold vacuum and engine temperature. The electronic spark selection device is capable of controlling the system to select the spark timing provided by the signal generating device or at a spark timing retarded from that provided by the signal generating device.

8 Claims, 5 Drawing Figures

| 210° F COOLANT 1=UNDER 0=OVER | 8 IN HG MANIFOLD VACUUM 1=OVER 0=UNDER | 120° F COOLANT 1=UNDER 0=OVER | 1300 RPM ENGINE SPEED 1=OVER 0=UNDER | NO DELAY 0° | DELAY #1 8° | DELAY #2 14° |
|---|---|---|---|---|---|---|
| 0 | 0 | 0 | 0 | | X | |
| 0 | 0 | 0 | 1 | | X | |
| 0 | 0 | 1 | 0 | | X | |
| 0 | 0 | 1 | 1 | | X | |
| 0 | 1 | 0 | 0 | | X | |
| 0 | 1 | 0 | 1 | | X | |
| 0 | 1 | 1 | 0 | | X | |
| 0 | 1 | 1 | 1 | | X | |
| 1 | 0 | 0 | 0 | | X | |
| 1 | 0 | 0 | 1 | | X | |
| 1 | 0 | 1 | 0 | | | X |
| 1 | 0 | 1 | 1 | | | X |
| 1 | 1 | 0 | 0 | | X | |
| 1 | 1 | 0 | 1 | X | | |
| 1 | 1 | 1 | 0 | | | X |
| 1 | 1 | 1 | 1 | | | X |

*Fig. 4*

TIMING DIAGRAM

*Fig. 5*

SPARK TIMING CONTROL SYSTEM FOR AN INTERNAL COMBUSTION ENGINE

This invention relates to electronic spark timing control systems for internal combustion engines.

The spark timing of internal combustion engines has been controlled in the past by magnetic pickup types of distributors which have a vacuum unit for providing vacuum advance and cam and flyweight arrangements that provide centrifugal advance. The timing signal generated by the magnetic pickup is shifted in phase from initial timing by the vacuum unit and the flyweights and this signal is used to control the switching of an electronic device such as a transistor to determine the time of spark plug firing. The variation in spark timing provided by this arrangement is limited to spark timing functions that can be developed by the vacuum unit and centrifugal flyweight and cam configurations.

In another type of spark timing control an electronic system is provided which responds to crankshaft position signals and to signals that are indicative of the various engine operating parameters including engine speed and manifold vacuum. In an electronic spark timing system the distributor vacuum unit and centrifugal mechanism can be eliminated by the system still requires devices for developing electrical signals which are accurate functions of engine speed and manifold vacuum and requires electronic devices for translating these signals into spark timing control signals.

The present invention proposes a simple and economical arrangement for controlling spark timing as a function of various engine operating parameters. To this end the spark timing control of this invention utilizes the known pulse generator type of distributor having vacuum and centrifugal advance mechanisms which provide spark timing control signals. The system includes a spark timing controller which is capable of delaying or retarding the spark from the timing value provided by the pulse generator in a plurality of selectable steps. A spark selection network, responsive to a plurality of engine operating conditions, is provided which is operative to select the instantaneous spark timing provided by the pulse generator or one of the spark retards provided by the spark timing controller. In carrying this object forward the pulse generator is initially set relative to the engine crankshaft to provide an advanced spark timing consistent with good fuel economy. The spark timing is then selectively retarded in response to engine operating conditions to prevent engine knock and to provide engine operation consistent with exhaust gas emission standards.

It accordingly is one of the objects of this invention to provide a spark timing control system in which a pulse generator having vacuum and centrifugal controls provides a spark timing value and wherein a spark timing controller is provided which is capable of providing spark timing values retarded from the value provided by the pulse generator and further wherein the system includes electronic spark selection means for alternatively selecting the instantaneous spark timing provided by the pulse generator or retarded spark timing values as a function of a plurality of engine operating conditions.

Another object of this invention is to provide a spark timing control system of the type described wherein the spark timing controller is capable of retarding spark timing in steps that substantially represent predetermined crankshaft angles in terms of crankshaft degrees regardless of engine speed. The spark timing controller comprises a ramp voltage generator including a capacitor which is repetitively charged and discharged when spark retard has been selected. The charge cycle is initiated when the pulse generator calls for ignition and is terminated when a ramp voltage attains a predetermined magnitude. When this predetermined magnitude is attained spark plug firing is initiated and the capacitor is now discharged. The capacitor continues to discharge until the next charge cycle is initiated. The charge and discharge cycles occur at constant currents. The time that elapses for the ramp voltage to attain the predetermined voltage represents the amount of spark retard in terms of a predetermined number of degrees of rotation of the crankshaft. Thus, even though engine speed changes the charge time of the capacitor still substantially represents a predetermined crankshaft angle of rotation due to the charge and discharge of the capacitor at constant current rates.

As pointed out, the ignition system of this invention uses the existing pulse generator having vacuum and centrifugal controls. It should be noted that the system of this invention requires only the single pickup coil of the existing pulse generator and there is no need for additional pickup coils that would be angularly spaced and selectively utilized to provide different spark timing values. Instead of using a plurality of angularly spaced pickup coils the present invention uses the single pickup coil, initial spark timing is set to an advanced condition, and spark retard occurs from the initial advanced condition selectively in response to engine operating conditions.

Another advantage of this invention is that the sensors that supply information to the spark selection device can be relatively simple and inexpensive. Thus, the spark selection device is arranged to respond to engine conditions which are over or under certain values rather than requiring a signal that has some continuous variation as a function of an engine operating parameter. As one example, engine temperature information is applied to the spark selection device and the sensors for providing this information can take the form of simple thermostatic switches.

Figure 1:
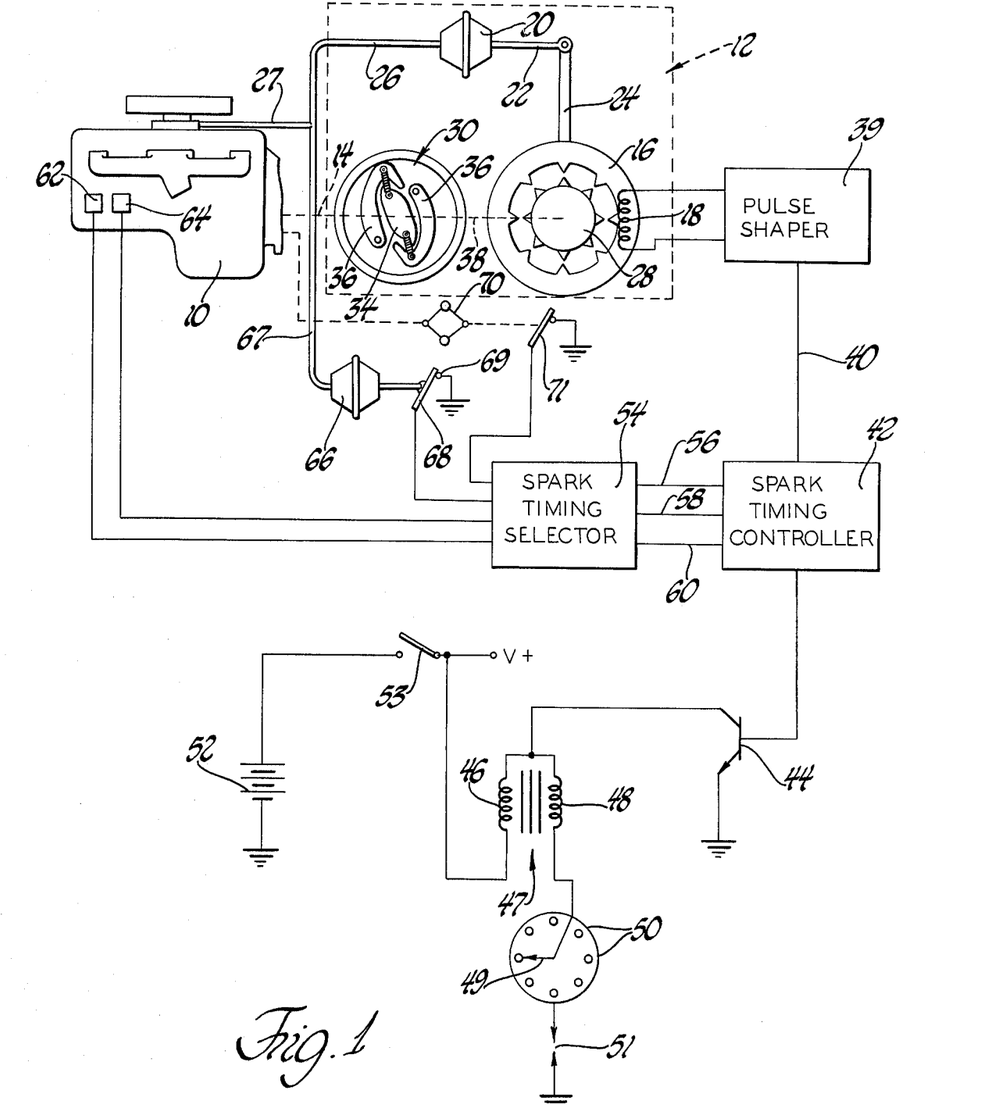
FIG. 1 illustrates an ignition system made in accordance with this invention.

Referring now to the drawings and more particularly to FIG. 1, the reference numeral 10 designates an internal combustion engine the ignition timing of which is controlled by the ignition system of this invention.

The ignition system of this invention utilizes a conventional magnetic pulse generator having centrifugal and vacuum controls to provide a position voltage synchronized with engine crankshaft position. The pulse generator is driven by the camshaft of the internal combustion engine and preferably is of the type disclosed in the United States patents to Boyer et al., U.S. Pat. No. 3,888,225 and to Campbell et al., U.S. Pat. No. 3,923,028. In the interest of simplifying the disclosure of this invention the pulse generator of the type disclosed in U.S. Pat. Nos. 3,888,225 and 3,923,028 is schematically illustrated in FIG. 1 and identified by reference numeral 12. The pulse generator 12 has a shaft 14 which is driven by the camshaft of the internal combustion engine 10. The pulse generator 12 has a pole piece 16 that carries a pickup coil 18. The pole piece 16 is rotatably supported by the base of the distributor as is described in the above-referenced patents and is adjustable relative to the base of the distributor by a vaccum unit 20 having a rod 22 connected to an arm 24 secured to the pole piece 16. The rod 22 is shifted by the vacuum unit 20 to rotatably adjust the pole piece 16 relative to the base of the distributor that is fixed in the engine. The vacuum unit 20 is connected to the intake manifold of the engine 10 by pipes 26 and 27.

Figure 5:
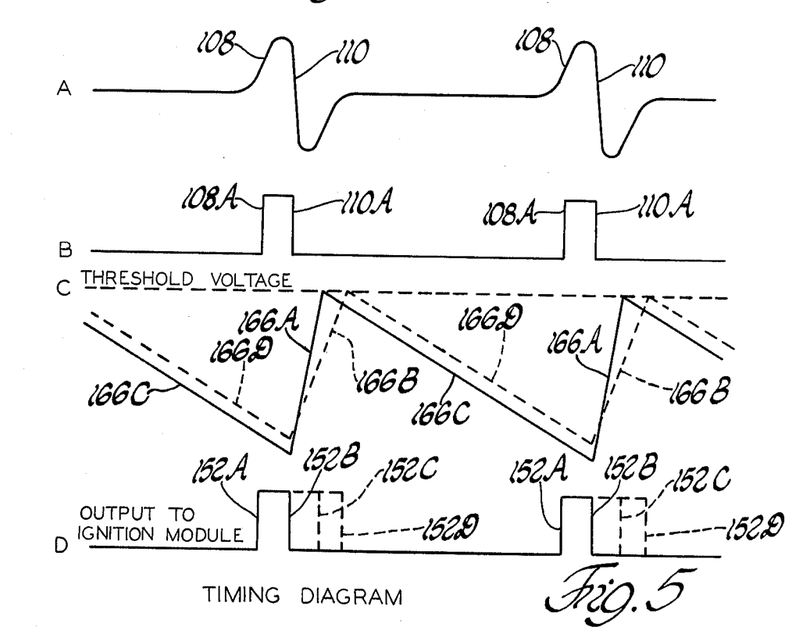
FIG. 5 is a timing diagram of voltage waveforms that are referred to herein in explaining the operation of this invention.

The magnetic pulse generator 12 further includes a rotor 28 having projecting teeth. As the rotor 28 rotates an alternating voltage is induced in the pickup coil 18 the waveform of which is shown in FIG. 5A. The rotor 28 is driven by the distributor shaft 14 through a centrifugal advance mechanism 30 having a cam plate 34 and flyweights 36. The cam plate 34 is rigidly connected to the rotor 28, this connection being indicated by the dotted line 38. As explained in the above-referenced patents the rotor 28 is adjusted angularly with respect to the distributor shaft 14 as a function of engine speed due to the centrifugal advance mechanism 30 and the adjustment is in such a direction as to advance spark timing as a function of engine speed. Further, as is known to those skilled in the art the pole piece 16 is rotatably adjusted relative to rotor 28 by the vacuum unit 20 to provide vacuum advance as a function of engine manifold vacuum. In summary, the voltage induced in the pickup coil 18 will be an alternating voltage depicted in FIG. 5A, and this voltage represents engine crankshaft position as modified by the vacuum advance unit 20 and the centrifugal advance mechanism 30. It thus will be appreciated that the alternating voltage induced in pickup coil 18 is phase shifted in a spark advance direction, depending upon the operation of vacuum unit 20 and centrifugal advance mechanism 30.

The voltage induced in the pickup coil 18 is applied to a pulse shaper designated by reference numeral 39. The pulse shaper, as is more fully described hereinafter, provides a square wave voltage on line 40 which is illustrated in FIG. 5B. This square wave voltage is developed by the positive half cycles of the alternating control voltage induced in the pickup coil 18. The square wave voltage on line 40 is supplied to a spark timing controller designated by reference numeral 42 and shown in detail in FIG. 2. The spark timing controller is coupled to a switching transistor 44 connected with the primary winding 46 of an ignition coil 47. The secondary 48 of the ignition coil is connected to the rotor contact 49 of the distributor which sequentially connects contacts 50 on a distributor cap to a respective spark plug, one of which is illustrated and designated by reference numeral 51. The primary 48 of the ignition coil is connected to the positive side of the motor vehicle battery 52 through an ignition switch 53. As is more fully described hereinafter the transistor 44 is switched on and off to cause spark firing energy to be developed to fire the spark plugs of the engine.

The spark timing control has been illustrated as controlling an eight-cylinder engine which requires eight teeth on rotor 28 and pole piece 16 as well as eight distributor cap contacts 50, all of which are illustrated in FIG. 1.

The terminal V+ is connected to the positive terminal of battery 52 when switch 53 is closed. The terminal V+ is connected to other terminals that have been identified as V+ in the drawings by conductors which are not illustrated.

Figure 3:
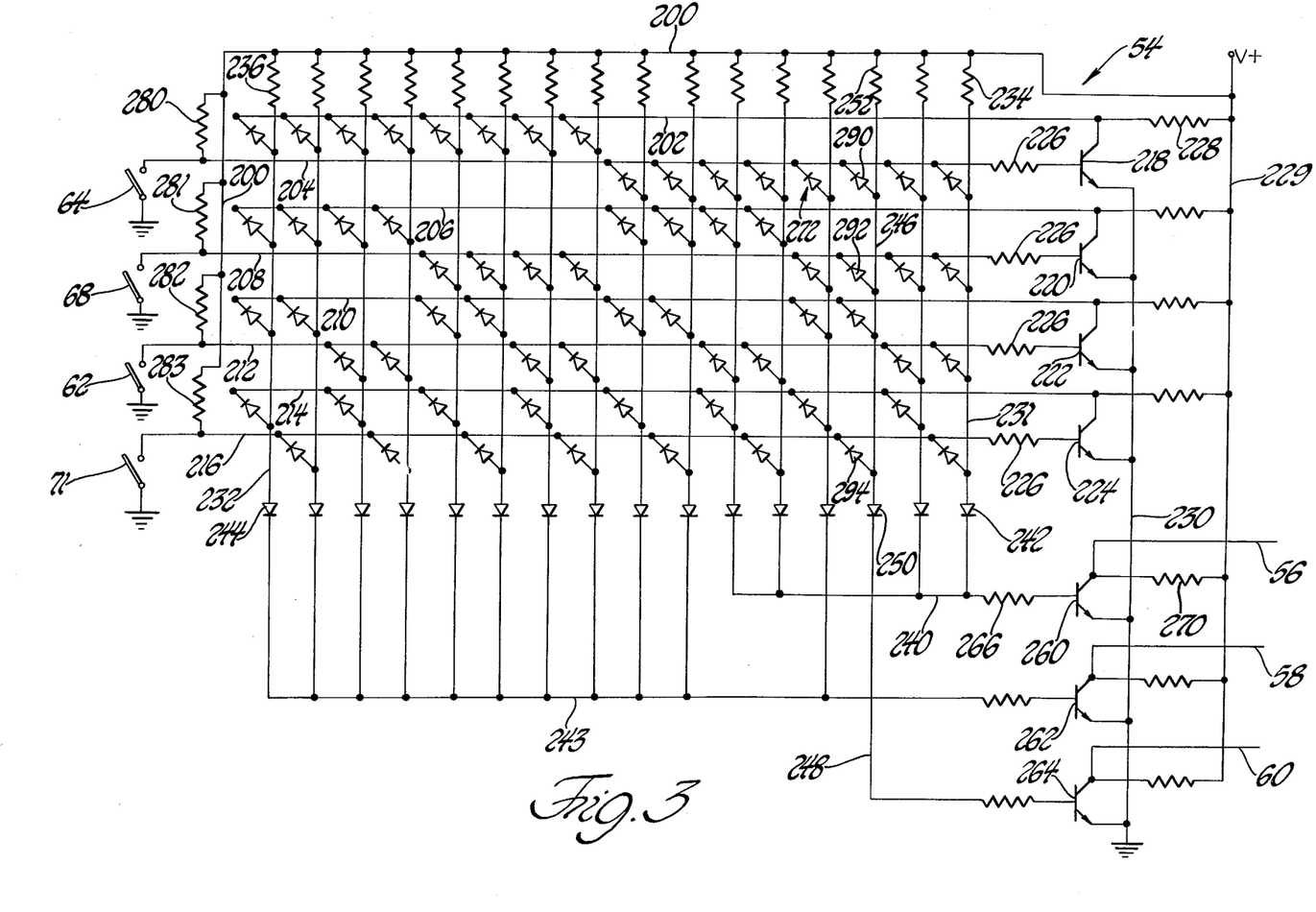
FIG. 3 is a schematic circuit diagram of the spark timing selector illustrated in block diagram form in FIG. 1.

The spark timing controller 42 is connected to a spark timing selector designated by reference numeral 54 and disclosed in detail in FIG. 3. The spark timing selector has three control output lines 56, 58 and 60 connected to the spark timing controller 42. As will become more readily apparent hereinafter the lines 56, 58 and 60 are operative to select one of three different spark timing values for the ignition system of this invention.

Figure 2:
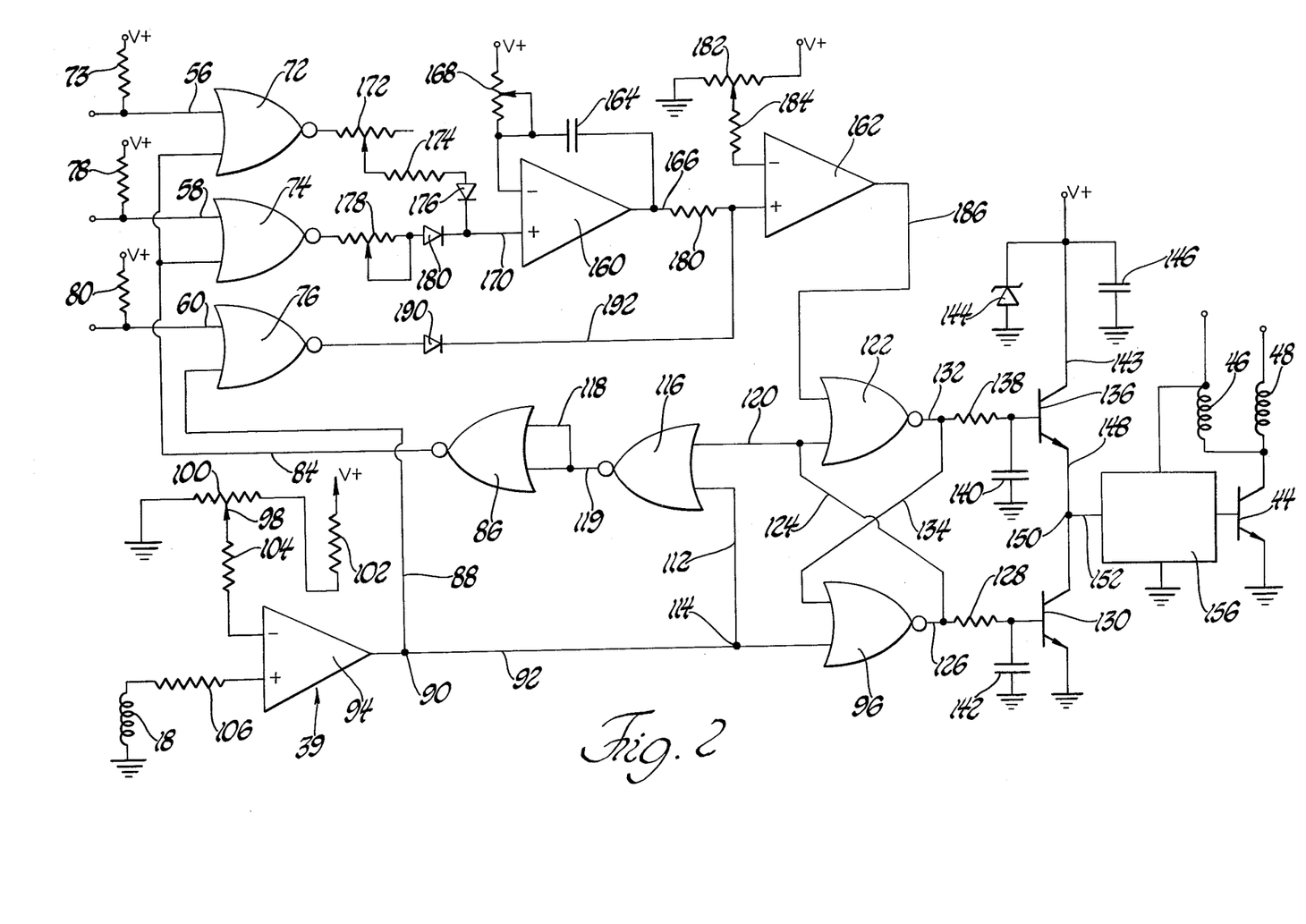
FIG. 2 is a schematic circuit diagram of the spark timing controller illustrated in block diagram form in FIG. 1.

The spark timing controller 42 is shown in detail in FIG. 2 and is shown connected with the ignition coil switching transistor 44. The purpose of the spark timing controller 42 is to cause the spark timing to be retarded as a function of the input signals applied to conductors 56, 58 and 60. As will become more readily apparent hereinafter, the spark timing controller 42 responds to high or low voltage conditions applied respectively to lines 56, 58 and 60 in accordance with engine operation conditions.

The spark timing selector 54 is comprised of a logic network shown in FIG. 3 and this logic network responds to certain combinations of engine operating conditions to select the desired spark timing. To this end the spark timing selector 54 is supplied with input information in binary form representing, respectively, engine speed, engine manifold vacuum, low engine coolant temperature and high engine coolant temperature.

The low coolant temperature input is a thermostatic switch 62 shown in FIGS. 1 and 3. This switch may be of the known bimetal type and is positioned in the engine coolant system to sense engine coolant temperature. This switch is open at temperatures below, for example, 120° F. and is closed at temperatures above this value. When this switch closes it grounds an input conductor to spark timing selector 54 as shown in FIG. 3.

The high temperature input is also a thermostatic switch 64 that responds to engine coolant temperature. This switch is open at coolant temperatures below, for example, 210° F. and is closed at temperatures above this value. When switch 64 is closed it grounds an input conductor to spark timing selector 54 as shown in FIG. 3.

The intake manifold vacuum input to spark timing selector 54 is provided by a vacuum unit 66 connected to the intake manifold of engine 10 by a pipe 67. The vacuum unit contains the usual diaphragm and spring and operates a switch contactor 68. By way of example, the switch contactor 68 is in a closed position engaging fixed contact 69 when engine intake manifold vacuum is less than 8 inches Hg. In this closed position one of the inputs to spark timing selector 54 is grounded as is evident from FIGS. 1 and 3. At manifold vacuums in excess of 8 inches Hg the switch contactor 68 is moved to an open position.

The speed input to the spark timing selector 54 is provided by a centrifugal switch which is driven by the engine and responds to engine speed. The switch includes flyweights 70 which operate a switch contactor 71. The switch is arranged such that contactor 71 is closed to ground an input to selector 54 when engine speed is below, for example, 1300 rpm and is open at engine speeds above this speed.

Referring now to FIG. 2, it is seen that the conductor 56 is connected to one input terminal of a NOR gate 72 and is also connected to V+ voltage through a resistor 73. In a similar fashion, conductor 58 is connected to the input terminal of NOR gate 74 and conductor 60 is connected to an input terminal NOR gate 76. The conductors 58 and 60 are connected to V+ voltage through resistors 78 and 80. The other input terminals of NOR gates 72 and 74 are commonly connected to a conductor 84 which in turn is connected to the output of NOR gate 86. The other input terminal of NOR gate 76 is connected to a conductor 88 which in turn is connected to junction 90. The junction 90 is connected to conductor 92 which connects the output of a current differencing operational amplifier 94 to the input of a NOR gate 96. The negative terminal of the operational amplifier 94 is connected to a tap 98 on potentiometer resistor 100 which is connected between V+ voltage and ground through a resistor 102. A resistor 10 connects the negative terminal of operational amplifier 94 to the adjustable tap of the potentiometer. The positive terminal of current differencing operational amplifier 94 is connected to the pickup coil winding 18 through a resistor 106. The operational amplifier 94 receives the alternating output voltage of pickup coil 18 shown in FIG. 5A and operates to provide a square wave output voltage on conductor 92 which is illustrated in FIG. 5B. As such, this operational amplifier and its associated resistors form the pulse shaper 39 shown in FIG. 1. This square wave voltage corresponds to the positive half cycle of the alternating control voltage induced in pickup coil 18 with the leading edge 108A thereof corresponding to a point in time when the pickup voltage goes positive (portion 108) and with the trailing edge 110A thereof corresponding in time to when the negative voltage transition 110 crosses substantially zero. This square wave voltage is applied to one of the input terminals of a NOR gate 96 and is also applied to one of the input terminals of NOR gate 76 through conductor 88. As will be more fully described hereinafter the leading edge 108A of the square wave voltage serves to turn on the output transistor 44. The trailing edge 110A of the square wave voltage is used to control the charging of a capacitor and at times to initiate a spark firing event.

The conductor 92 is connected to conductor 112 at junction 114. The conductor 112 is connected to the input of a NOR gate 116. The output of NOR gate 116 is connected to the two inputs of NOR gate 86 through conductors 118 and 119. The other input of NOR gate 116 is connected to a conductor 120 which in turn is connected to an input of NOR gate 122. This input terminal of NOR gate 122 is connected to a conductor 124 which in turn is connected to conductor 126. The conductor 126 is connected between the output of NOR gate 96 and a resistor 128 which in turn is connected to the base of a transistor 130. It can be seen that the output of NOR gate 122 is connected to conductor 132 and this conductor is connected to one of the inputs of NOR gate 96 through a conductor 134. The conductor 132 is connected to the base of a transistor 136 through a resistor 138. Capacitors 140 and 142 respectively connect the bases of transistors 136 and 130 to ground.

The transistors 136 and 130 operate to control the switching of output transistor 44. To this end the collector of transistor 136 is connected to V+ voltage through a conductor 143. A Zener diode 144 and a capacitor 146 are connected between conductor 143 and ground. The emitter of transistor 136 is connected to the collector of transistor 130 by a conductor 148. The junction 150 on conductor 148 is connected to a conductor 152 which in turn is connected to the input of a switching circuit or ignition control module designated by reference numeral 156.

The switching circuit 156 and the transistor 44 can preferably take the form of ignition amplifiers or ignition modules of the type disclosed in the United States patents to LeMasters et al., U.S. Pat. No. 3,605,713 and Richards et al., U.S. Pat. No. 3,838,672. Thus, the transistor 44 disclosed herein corresponds to the transistor 10 of the Richards et al. U.S. Pat. No. 3,838,672. In addition, the signal developed between conductor 152 and ground is applied to circuitry corresponding to conductor 38 and ground of the above-mentioned Richards et al. patent, it being understood that in such an arrangement the pickup coil 9 of the Richards et al. patent is not used. The circuitry designated by reference numeral 156 of FIG. 2 therefore can correspond to the circuitry connected to transistor 10 of the Richards et al. patent, it being understood that the pickup coil 9 of the Richards et al. patent is not used. It will of course be appreciated that various other switching schemes or amplifiers could be utilized to cause the transistor 44 to switch on and off as a function of the voltage appearing between conductor 152 and ground.

The voltage that appears between conductor 152 and ground is a square wave voltage illustrated in FIG. 5D. The leading edge 152A of this square wave voltage is developed whenever transistor 136 is biased conductive and transistor 130 nonconductive and the trailing edge 152B of this voltage is developed when transistor 130 is biased conductive and transistor 136 is biased nonconductive. As will become apparent hereinafter the trailing edge 152B can be phase shifted to cause a retarding of spark timing to other positions indicated by the dotted lines 152C and 152D in FIG. 5D.

The instant of switching of transistors 130 and 136 is controlled by current differencing operational amplifiers 160 and 162. These amplifiers are connected in a conventional manner with V+ voltage and ground by circuitry which is not illustrated and these amplifiers are of the Motorola type MC 3401 or its equivalent. The operational amplifier 160, together with capacitor 164, operates as a bidirectional integrator to charge and discharge capacitor 164 to provide a sawtooth voltage waveform on conductor 166 which is shown in FIG. 5C. The negative input of current differencing operational amplifier 160 is connected to a variable resistor 168 which in turn is connected to V+ voltage. The negative input terminal of amplifier 160 is connected to the capacitor 164, the opposite side of which is connected to conductor 166 and therefore to the output of amplifier 160. The resistor 168 provides a bias for one input terminal of operational amplifier 160.

The positive input terminal of amplifier 160 is connected to a conductor 170. The conductor 170 is connected with the output of NOR gate 72 through variable resistor 172, a resistor 174 and a blocking diode 176. The conductor 170 is also connected to the output of NOR gate 74 through variable resistor 178 and a blocking diode 180.

As is known to those skilled in the art, the output of a current differencing type of operational amplifier, such as the Motorola MC 3401, depends upon the difference in input currents. Moreover, this type of amplifier is insensitive to input voltage changes with the result that when the amplifier 160 is connected to capacitor 164 in the manner illustrated in FIG. 2 the capacitor is charged and discharged at constant current rates and operates as a bidirectional integrator.

When an input signal is applied to conductor 170 from one or the other of NOR gates 72 or 74 the capacitor 164 will charge to provide the voltage waveforms identified by reference numerals 166A or 166B in FIG. 5C, depending on which NOR gate is then controlling. In this regard the resistance of resistors 172 and 174, as compared to resistance 178, determines the relative input currents to operational amplifier 160. These resistance values are of such relative magnitudes that when NOR gate 74 is controlling the ramp voltage 166A is provided and when NOR gate 72 is controlling the ramp voltage 166B is provided. The slope of these ramp voltages controls the amount of delay or retard of ignition timing as will be more fully described hereinafter.

When capacitor 164 is being charged the ramp voltage 166A or 166B of FIG. 5C will increase until a predetermined threshold voltage is attained. When this threshold voltage is attained the capacitor 164 will be switched to a discharge mode to provide for example, the decreasing ramp voltage 166C illustrated in FIG. 5, assuming NOR gate 74 is controlling. In order to accomplish this the operational amplifier 162 is connected to operate as a voltage threshold detector and its positive input is connected to conductor 166 through a resistor 180. The negative input terminal of operational amplifier 162 has a fixed current input bias provided by variable resistor 182 connected between V+ and ground and a resistor 184 connected between the adjustable tap of resistor 182 and the negative terminal of threshold detector 162. When the threshold voltage of operational amplifier 162 is attained it develops an output voltage on a conductor 186 which is applied to one of the input terminals of the NOR gate 122. This causes the voltage transition 152C or 152D, shown in FIG. 5C, to be developed which determines the point at which transistor 44 is turned off to develop an ignition voltage that is applied to a spark plug.

The positive terminal of threshold detector or amplifier 162 is connected to the output of NOR gate 76 via a blocking diode 190 and a conductor 192. In the event that NOR gate 76 is developing an output the threshold detector 162 will develop an output which causes a voltage transition to occur substantially at the point in time where the squre wave voltage of FIG. 5B goes in a negative direction (trailing edge 110A). This develops the negative voltage transition 152B and corresponds to a condition where the spark timing is not retarded but is controlled substantially exclusively by the signal voltage developed in pickup coil 18.

The input to the spark timing controller 42, which is comprised of conductors 56, 58 and 60, is connected to the spark timing selector 54 which is shown in detail in FIG. 3. The spark timing selector in FIG. 3 comprises a logic network which for a predetermined combination of inputs, provides an output that will determine ignition spark timing. This logic network or matrix is comprised of a plurality of conductors 200-216 which have been drawn horizontally in FIG. 3. The conductors 204, 208, 212 and 216 are connected respectively to the base electrodes of transistors 218, 220, 222 and 224 through respective resistors 226. The conductors 202, 206, 210 and 214 are respectively connected to the collectors of transistors 218-224. The collectors of transistors 218-224 are connected through respective equal valued resistors, one of which is identified by reference numeral 228, to a conductor 229 which in turn is connected to V+ voltage. The emitters of transistors 218-224 are respectively connected to a conductor 230.

The logic network or matrix, shown in FIG. 3, further includes a plurality of vertically drawn lines representing conductors, two of which have been designated by reference numerals 231 and 232 at opposite extremes of the matrix. The conductors 231 and 232 are connected respectively to resistors 234 and 236 which in turn are connected to a conductor 200 that is connected to V+ voltage. The conductor 231 is connected to a conductor 240 through a blocking diode 242. In a similar fashion the conductor 232 is connected to conductor 243 through a blocking diode 244. Another vertical conductor, identified by reference numeral 246, is connected to conductor 248 through blocking diode 250 and is connected to conductor 200 through a resistor 252.

The conductors 240, 243 and 248 are respectively connected to the base electrodes of NPN transistors 260, 262 and 264 through resistors 266. The emitters of transistors 260, 262 and 264 are connected to the conductor 230. The collectors of transistors 260, 262 and 264 are connected respectively to conductors 56, 58 and 60 and are also connected to power supply line 229 via respective equal valued resistors, one of which is identified by reference numeral 270. It will be apparent to those skilled in the art that when transistor 260 is nonconductive, in its collector-emitter circuit, the voltage of conductor 56 will go high and is applied to one of the inputs of NOR gate 72. On the other hand, when transistor 260 is biased conductive the voltage of conductor 56 will go low. The same type of operation applies to transistors 262 and 264 and these transistors therefore determine the state of the voltage (high or low) applied to conductors 58 and 60.

It can be seen from FIG. 3 that the horizontal and vertical conductors are connected by a plurality of diodes. As one example, a group of eight diodes 272 have their anodes connected to vertically extending conductors and have their cathodes connected to conductor 204. Certain other diodes and conductors will be identified by reference numeral during an explanation of the operation of the logic network shown in FIG. 3.

The conductor 204 is connected with one side of the high temperature coolant sensor switch 64, the opposite side of which is grounded. A resistor 280 connects conductor 200 to the line 204. The coolant switch 64, as previously described, responds to engine coolant temperature and is in an open condition at temperatures below, for example, 210° F. Should the coolant temperature reach 210° F. the switch 64 closes to connect conductor 204 to ground.

The conductor 208 is connected with the vacuum manifold sensor switch 68 and to V+ voltage through resistor 281. As previously described this switch is in a closed condition at manifold vacuums less than, for example, 8 inches Hg and opens at manifold vacuums in excess of 8 inches Hg. Thus, the conductor 208 is grounded whenever manifold vacuum is less than 8 inches Hg.

The conductor 212 is connected with the low temperature coolant sensor switch 62 and to V+ voltage through resistor 282. The switch 62, as previously described, can be any type of temperature responsive switch which is mounted on the engine to sense coolant temperature. The switch is arranged such that switch 62 is open when coolant temperature is under 120° F. and is closed when coolant temperature exceeds 120° F. It therefore is seen that conductor 212 will be grounded when the coolant temperature exceeds 120° F.

The conductor 216 is connected to the engine speed responsive switch 71 and to V+ voltage through resistor 283. When engine speed exceeds, for example, 1300 rpm, the switch 71 is in an open condition. When engine speed is below 1300 rpm the switch 71 is closed to ground line 216.

In regard to voltage states on conductors 204, 208, 212 and 216 it can be seen that when a sensor switch is open the conductor it controls goes to a high voltage state. As one example, when switch 64 is open conductor 204 goes to a high voltage state due to the connection to V+ voltage through resistor 280.

Figure 4:
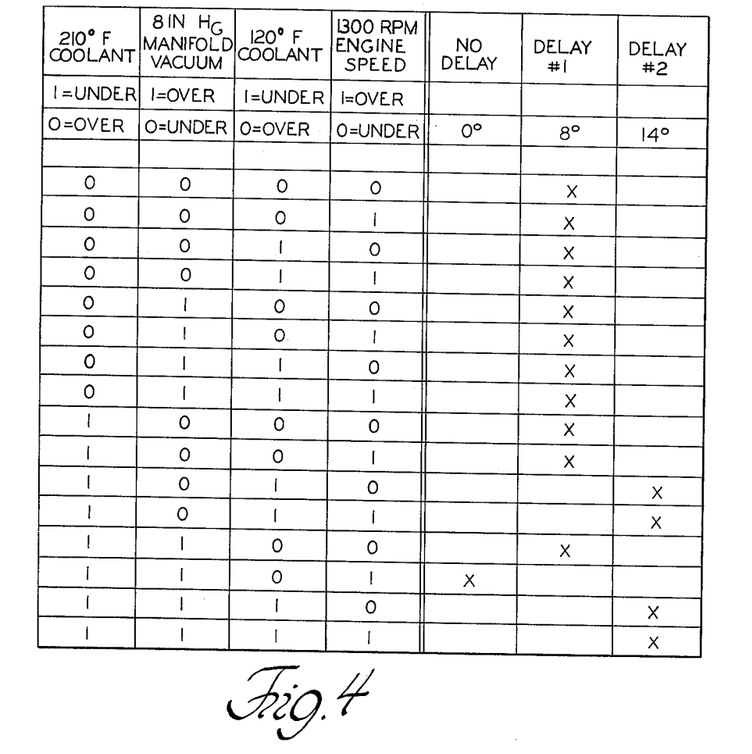
FIG. 4 is a chart illustrating certain spark timing values as a function of engine operating parameters.

The operation of the logic network or matrix shown in FIG. 3 will now be described with respect to the chart of FIG. 4. The chart of FIG. 4 illustrates various spark timing values as a function of four inputs to the spark timing selector 54 shown in FIG. 3. The zeros and ones in the chart indicate the voltage state of a particular conductor 204, 208, 212 and 216 of the logic network shown in FIG. 3. The zero state indicates a low voltage or a grounded connection for the just mentioned conductors. The ones, used in the chart of FIG. 4, indicate that the conductors 204, 208, 212 or 216 are at a high voltage condition, or putting it another way are not grounded. In the chart of FIG. 4, the legend for the vertical columns that are related to engine operating conditions indicate whether the one or the zero represents an under or over condition. As an example, with regard to the 210° F. coolant temperature parameter, a high voltage condition or a one indicates that a coolant temperature is below 210° F. and the zero condition or grounded condition of conductor 204 indicates that coolant temperature has exceeded 210° F. since the switch 64 is not closed.

The chart of FIG. 4 has three columns entitled "No Delay", "Delay #1" and "Delay #2". The "No Delay" column is the situation in which the falling edge 110 of the voltage developed in pickup coil 18 is controlling spark timing or, in other words, a situation in which there is no spark retard selected by selector 54. The "Delay #1" position corresponds to a first amount of retard and the "Delay #2" position corresponds to the maximum amount of retard.

The chart of FIG. 4 also indicates a "Delay #1" value of 8° and a "Delay #2" value of 14°. These specific values are included by way of example only, as an aid in understanding the operation of this invention, and values other than 8° or 14° can be used as is more fully described hereinafter. The "No Delay" condition (0°), refers to the mode of operation in which the spark timing is not delayed or retarded. The pulse generator vacuum and centrifugal controls provide a curve of spark timing values which are functions of engine speed and engine intake manifold vacuum. To provide initial timing the base of the distributor 12 is adjusted relative to the engine and therefore relative to the engine crankshaft. As an example, the initial timing may be adjusted so that spark plug firing occurs at 14° before top dead center under the condition where neither the centrifugal advance mechanism nor the vacuum unit have advanced timing in addition to the initial 14°. During engine operation timing will then be advanced by the centrifugal advance mechanism 30 and the vacuum unit 20 to provide timing advance in addition to the initial 14° advance.

During engine operation the spark timing may be selectively retarded to the "Delay #1" mode shown in FIG. 4 and when this occurs spark timing is retarded by 8° from the advance that is being provided by the centrifugal advance mechanism 30 and the vacuum unit 20.

The chart of FIG. 4 includes a "Delay #2" column which is also identified as 14°. This refers to a mode of operation in which the spark timing is retarded by 14° from the spark timing being instantaneously provided by vacuum unit 20 and centrifugal advance mechanism 30.

The chart of FIG. 4 indicates by an X what spark timing value is selected in response to the combination of sensor inputs to the logic network shown in FIG. 3. As an example, the first horizontal column of the chart of FIG. 4 shows four zeros which provides the "Delay #1" mode (spark retard of 8°).

This corresponds to a condition in which coolant temperature is in excess of 210° F., manifold vacuum is less than 8 inches Hg, coolant temperature is in excess of 120° F. and engine speed is under 1300 rpm.

As another example, the "No Delay" or 0° retard mode is provided when engine operating conditions are as shown in the chart of FIG. 4. This corresponds to a binary input of (1) (1) (0) (1). This further corresponds to an engine operating condition in which the coolant temperature is below 210° F., intake manifold vacuum is over 8 inches Hg, coolant temperature is over 120° F. and engine speed is over 1300 rpm.

In order to explain the operation of the logic network in FIG. 3 it is pointed out that the system is arranged such that when the voltage on line 56 goes low the "Delay #2" is provided, when the voltage on conductor 58 goes low the "Delay 190 1" is provided and when the voltage on conductor 60 goes low the "No-Delay" mode is provided. Assuming the condition of "No Delay", as shown by the X in the chart of FIG. 4, the system must operate to bias transistor 264 conductive to drive conductor 60 to a low voltage. From the chart of FIG. 4 it can be seen that in order to obtain the "No-Delay" mode the 210° coolant switch 64 will be open, the manifold vacuum switch 68 will be open, the 120° coolant switch 62 will be closed and the speed switch 71 will be open. Putting it another way, the voltages of lines 204, 208 and 216 will be in a high state whereas the voltage of conductor 212 will be in a low state since it is grounded. Assuming this condition, none of the diodes 290, 292 and 294, which have their anodes connected to conductor 246 are forward biased conductive to ground, with the result, that the voltage on line 246 is in a high state. This voltage is applied to the base of transistor 264 through blocking diode 250 to bias it conductive between collector and emitter to thereby place conductor 60 at a low voltage. During this "No-Delay" mode of operation the logic network places low voltages on the base electrodes of transistors 260 and 262 so that they are biased non-conductive to maintain the voltages of conductors 56 and 58 in a high state.

The NPN transistors 218, 220, 222 and 224 operate as inverters and have their collector-emitter circuits connected respectively between conductors 202, 206, 210 and 214 and grounded conductor 230. Thus, if transistor 218 is biased conductive the conductor 202 is connected to ground through the collector-emitter circuit of transistor 218. This type of operation also applies to transistors 220, 222 and 224.

During the above described "No Delay" mode of operation, transistors 218, 220 and 224 are conductive and transistor 222 is biased non-conductive. This connects conductors 202, 206 and 214 to ground with conductor 210 being at a high voltage. This set of conditions has no effect on the high voltage state of conductor 248.

The logic matrix of FIG. 3 will produce the other outputs shown in the chart of FIG. 4 in response to the various combinations of inputs shown in this chart.

In the circuit diagram of FIG. 3 the resistors 234, 236 and 252 as well as the other resistors (not identified by reference numerals) connected between conductor 200 and a respective vertically drawn matrix conductor, for example conductor 231 all have the same resistance value. In FIG. 3 electrical connections between circuit elements have been depicted by dots.

The operation of the ignition system of this invention will not be described. Assuming that the spark timing selector 54 has a combination of inputs which call for the "No Delay" mode of operation, the spark timing will be determined by the vacuum unit 20 and centrifugal advance mechanism 30. During such a condition of operation the voltage on line 60 will be in a low state and the voltage on conductors 56 and 58 will be in a high state. Since NOR gates 72 and 74 have high input voltages from conductors 56 and 58 both NOR gates 72 and 74 have no output so that there is no input to operational amplifier 160 to initiate a charging cycle for capacitor 164. The input to NOR gate 76 from conductor 60 is low and its other input from conductor 88 will be high for the duration of the pulse shown in FIG. 5B. As previously described, when the voltage transition 110 occurs (FIG. 5A) the trailing edge 110A of the output voltage of pulse shaper amplifier 94 is developed and when this happens the input to NOR gate 76 from line 88 goes low. Since the input to NOR gate 76 from line 60 now is also in a low state the NOR gate 76 develops a high output voltage. This high output voltage is applied to the positive input of operational amplifier 162 which instantaneously develops a high output on conductor 186. The output on conductor 186 is applied to one input of the NOR gate 122 and since its other input is now a low state the output of NOR gate 122 makes a transition from a high value to a low value. When this happens the transistor 136 is biased to a nonconductive condition from a previously conducting condition and the output of NOR gate 96 is such that at the same time transistor 130 is biased from a previously nonconductive condition to a conductive condition. This generates the trailing edge 152B of the voltage pulse shown in FIG. 5D which causes transistor 44 to be biased nonconductive and therefore cause an ignition pulse to be developed to fire one of the spark plugs of the engine.

The operation of the circuit will now be described under the assumption that the spark timing selector 54 has selected the "Delay #1" mode of operation. During this condition of operation the logic spark timing selector network 54 causes the voltage of conductors 56 and 60 to remain high and causes the voltage on conductor 58 to go low. As a result, the outputs of NOR gates 72 and 76 are prevented from going high. During this condition of operation the NOR gate 74 has a low voltage applied to one of its input terminals from conductor 58. The voltage on the other input terminal is the voltage on conductor 84. The NOR gate 74 will have no output as long as the voltage on conductor 84 is high. Conductor 84 is connected to the output of NOR gate 86, which itself is connected to act as an inverter for the output of NOR gate 116. Thus, NOR gates 116 and 86 together function as an equivalent OR gate, which produces a high output on conductor 84 when either input conductor 120 or 112 is high. A low output on conductor 84 is produced only when both input conductors 120 and 112 are low, which will be the case immediately after the trailing edge 110A of the shaped input pulse of FIG. 5B is produced on conductor 92. When the low output on conductor 84 is thus produced, the output of NOR gate 74 will go high since both of its inputs are now in a low state. The output of NOR gate 74 is supplied to the positive terminal of amplifier 160 through resistor 178, diode 180 and conductor 170. This causes the capacitor 164 to begin to charge and the ramp voltage 166A shown in FIG. 5C is developed as capacitor 164 is charging. The capacitor continues to charge until a threshold voltage is developed on conductor 166 sufficient to cause amplifier 162 to develop an output. When amplifier 162 develops an output the circuitry comprising NOR gates 122 and 96 and transistors 136 and 130 develop the trailing edge 152C of the voltage on line 152 (FIG. 5D) which turns the transistor 44 off at a time delay determined by the time required for the ramp voltage 166A to attain the predetermined threshold voltage. This means that spark timing has now been retarded, for example, by 8° from the trailing edge 152B of the voltage waveform illustrated in FIG. 5D.

As long as the spark timing selector 54 is calling for the "Delay #1" mode the spark timing will be retarded by a predetermined amount. During this mode of operation the capacitor 164 will begin a discharge cycle of operation and initiate the generation of voltage ramp 166C as soon as the threshold voltage is attained. The capacitor 164 will continue to discharge until the next voltage transition 110A occurs whereupon the capacitor will start a charge cycle. The initiation of the charge cycle is therefore determined by the point at which ignition would occur were it not for the fact that the spark selector has selected a retarded spark timing. Moreover, the discharge cycle for the capacitor is initiated whenever the voltage on line 166 attains a threshold voltage sufficient to trigger amplifier 162 to a high output. The initiation of the discharge cycle requires that the input voltage to the positive terminal of amplifier 160 go low when the output voltage of amplifier 162 on line 186 goes high. This is accomplished by a feedback path from the output of amplifier 162 on line 186 to the input to NOR gates 72 and 74 through conductor 84. This path includes NOR gates 116 and 86 which are gated from conductors 112 and 124 such that a high voltage is applied to conductor 84 and therefore to one of the inputs of NOR gate 74 to cause the output voltage of NOR gate 74 to go low when the threshold voltage is attained to initiate the discharge cycle of capacitor 164.

The operation of the ignition system when the "Delay #2" mode is selected is similar to the operation in the "Delay #1" mode with the exception that the slope of the voltage on line 166 is changed to the curve 166B shown in FIG. 5C to provide ignition firing at the trailing edge 152D of the pulse shown in FIG. 5D. Thus, during this mode of operation the voltage on line 56 is low whereas the voltages on lines 58 and 60 are high. This means that the NOR gate 72 will periodically develop output voltage pulses to cause the capacitor 164 to charge and discharge. As can be seen from FIG. 5C the slope of the ramp voltage 166B has been changed due to the fact that less current is supplied to the positive terminal of amplifier 160 because the combined resistance of resistors 172 and 174 is higher than the resistance of resistor 178. The ignition system will now continue to operate to provide the "Delay #2" mode of operation wherein, for example, spark timing is retarded by 14° from the trailing edge 152B of the voltage pulse shown in FIG. 5D. In this mode of operation the NOR gates 116 and 86 again provide part of a feedback path for causing a low voltage to be applied to the input of operational amplifier 160 at the point in time when ignition firing occurs to initiated the discharge cycle of capacitor 164. In addition, and like in the "Delay #1" mode, the capacitor charge cycle is initiate when the trailing edge 110A of the output voltage of pulse shaping amplifier 94 occurs.

The time required for the ramp voltage 166A on line 166 to reach the trigger level of amplifier 162, which corresponds to the period of time capacitor 164 is charging, represents substantially a predetermined angle of rotation of the engine crankshaft regardless of engine speed. During the generation of ramp voltage 166A, capacitor 164 is charged for a predetermined time period and the engine will rotate through some angle of rotation. If this time period was constant, the magnitude of the angle of rotation of the engine crankshaft would decrease as engine speed increases and would increase as engine speed decreases. The time period of the charge cycle of capacitor 164 is not constant, however, since it is preceded by a discharge cycle which is a function of engine speed. Thus, when engine speed increases the time period of each discharge cycle of capacitor 164 decreases with the result that the capacitor voltage at the end of the discharge cycle will not have gone as far below the threshold of amplifier 162. Thus, with reference to FIG. 5C the ramp voltage 166C will ramp down to lesser lower levels as engine speed increases with the result that it will take less time for the ramp 166A to attain the threshold voltage level. A similar analysis can be applied to decreasing engine speed. In this case the ramps 166C will occur for longer periods of time with the result that it will take longer for a ramp 166A to reach the threshold voltage. As a result of the repetitive charging and discharging of capacitor 164 the time duration of ramps 166A developed at the output of amplifier 160 represent a predetermined angle of rotation of the engine crankshaft which does not vary with changes in engine speed. Thus, when ramps 166A are being generated (Delay #1) and are controlling the system, spark timing is retarded by substantially 8° over the entire speed range at which the 8° retard has been selected. It will of course be appreciated that a sudden change in engine speed may introduce a slight temporary error in regard to the actual number of engine degrees represented by the time period of ramps 166A.

The timing diagram waveforms of FIG. 5 are intended to be general representations of the voltages existing in the ignition system of this invention on an elapsed time basis with the engine running at a constant speed and with the abscissas representing time. These waveforms are not exact oscilloscope traces of actual waveforms that exist in the system nor have they been drawn to any absolutely precise scale factor. The waveforms do illustrate the general principles of operation of the ignition system in a manner that will be readily understood by those skilled in the art.

In summary, the ignition system of this invention utilizes a known pulse generator type of distributor having centrifugal and vacuum controls and a single pickup coil. Initial timing is set to a more than normal advanced position and the maximum spark advance obtainable is dictated by the instantaneous spark advance provided by vacuum unit 20 and centrifugal advance mechanism 30 when the "No Delay" mode of operation has been selected. The spark timing can be retarded in at least two steps from the initial advanced condition in response to the occurrence of certain combinations of engine operating parameters.

The specific logic network shown in FIG. 3 could take other forms as long as it is capable of controlling the spark timing controller of FIG. 2 in response to input signals that represent engine operating conditions.

The current differencing operational amplifiers 94, 160 and 162 preferably are of the Motorola MC 3401 type or its equivalent. It will be appreciated that other types of operational amplifiers could be utilized as long as they are used with the appropriate circuits to produce waveforms equivalent to those developed herein.

The speed signal input to spark timing selector 54 is shown in FIG. 1 as a centrifugal switch 71. This illustrates the general principle of providing a switching action at a predetermined engine speed. The switch 71 may take the form of an electronic switching device, such as a transistor, which is switched conductive by known electronic tachometer arrangements when a predetermined engine speed is attained and which is nonconductive at engine speeds below the predetermined speed. In this regard, the time period between pulses developed by amplifier 94, shown in FIG. 5B, varies as engine speed varies. Thus, as engine speed increases less time will elapse between successive pulses. These pulses can be applied to a one-shot multivibrator so that a square wave voltage is developed by the multivibrator for each pulse input having a pulse width of a predetermined constant time period. The multivibrator output and the pulses can be applied to conventional coincidence detector circuitry such that when the square wave voltage initiated by one pulse still exists when the next pulse occurs a switching action control signal is developed when engine speed attains a predetermined value.

The chart of FIG. 4 sets forth various specific spark retard timing values as functions of specific engine operating parameters and the operation of the ignition system of this invention has been described with reference to the specific values set forth in FIG. 4. These specific timing values and engine operation conditions generally represent the principle of stepped spark retards in response to various combinations of engine operation conditions. It is pointed out, however, that the specific values set forth in the chart of FIG. 4 may be varied, both as to engine operating conditions and as to specific spark retard values since the spark timing requirements of different kinds of engines may not be the same. Moreover, since the engine must meet Federal emission control standards as well as any state standards, such as California, there may be variations in spark timing requirements even between engines of the same general type. The chart of FIG. 4 does illustrate the general operating principles of this invention in that the "Delay #1" and "Delay #2" modes correspond to some amount of spark retard for a given engine and for a given set of engine operating conditions. These values can vary and as one example the "Delay #" mode with the conditions shown in the chart of FIG. 4 may have a value of approximately 5° or 6° rather than the 8° value indicated on the chart. It is further pointed out that the amount of spark retards will be related to the initial spark timing setting.

In regard to initial spark timing setting, the spark timing is initially set to an advanced condition by an amount that could cause undesirable engine operation from an exhaust gas emission standpoint and/or from an engine knock standpoint were the spark not retarded under certain engine operating conditions. The amount of spark retards for a given set of engine operating conditions is then selected to provide maximum fuel economy and acceptable engine operation.

It should be noted that the voltage waveforms of FIG. 4 relate to ignition timing control of an eight cylinder engine and as such the voltage transitions 110 and other related voltage transitions will occur every 90° of engine crankshaft rotation. The general system principles disclosed herein are applicable however, to the control of engines other than eight cylinders.

As previously pointed out, the opening and closing of the various engine condition responsive switches provides high or low voltage inputs to the spark timing selector logic network 54. The low voltage condition refers to a grounded input and the high voltage condition to a non-grounded input. The four inputs providing a binary voltage input to the selector with each switch representing one bit of the input voltage to the spark selection network. It will be course be appreciated that levels other than a ground condition can be utilized to provide the low voltage condition and in general the system responds to relative voltage levels.

What is claimed is:

1. A spark timing system for an internal combustion engine comprising, at least one spark electrode for igniting the combustible mixture of said engine, means responsive to a spark firing control signal for causing spark firing energy to be applied to said spark electrode device, means driven by the crankshaft of said engine for generating a crankshaft position voltage which represents engine crankshaft position, engine speed advance means responsive to engine speed for phase shifting said crankshaft position voltage in the spark advance direction as a function of increasing engine speed, vacuum advance means responsive to engine manifold vacuum for phase shifting said crankshaft position voltage in the spark advance direction with increasing manifold vacuum, said engine speed and vacuum advance means jointly providing continuously variable spark advance functions which under some conditions are more advanced than desirable for certain conditions of engine operation and under all conditions providing the maximum spark advance for said system, spark timing control means for causing firing of said spark electrode device either at substantially the time of occurrence of a predetermined voltage transition of said crankshaft position voltage as determined by said engine speed and vacuum advance means or at either of at least first or second spark retards corresponding respectively to predetermined timing value that are retarded by predetermined crankshaft angles of rotation from the occurrence of said voltage transition, said spark timing control means comprising bidirectional ramp voltage generating means, an electronic spark selection logic network responsive to a binary input voltage having an output coupled to said spark timing control means for determining the spark timing mode of operation, and a plurality of engine condition responsive sensors each sensing a respective engine operating condition and each coupled to the input of said spark selection logic network to provide respective bits of binary input voltage thereto, the bit voltage provided by each sensor being a function of whether a respective engine operating condition is above or below a predetermined magnitude, said spark selection logic network and engine condition responsive sensors being so arranged that the simultaneous occurrence of a first predetermined combination of engine sensor outputs causes said spark timing to be controlled by said crankshaft position voltage, operative during a second combination of sensor outputs to provide said first spark retard and operative during a third combination of engine sensor outputs to cause said second spark retard.

2. A spark timing control system for an internal combustion engine comprising, a voltage pulse generator driven by the crankshaft of said engine having engine speed and vacuum advance mechanisms responsive respectively to engine speed and manifold vacuum for generating a spark advance control signal related to engine crankshaft position by the advance functions provided respectively by said engine speed and vacuum advance mechanisms, said engine speed and vacuum advance mechanisms operative to provide the maximum spark advance obtainable with said system from an initial spark advance setting, a bidirectional ramp voltage generating means, means for at times causing said ramp voltage generating means to initiate a ramp voltage of one sense substantially at the occurrence of said spark advance control signal, means for terminating said ramp voltage of said one sense and for causing said ramp voltage generating means to initiate a ramp voltage of an opposite sense when said ramp voltage of said one sense reaches a predetermined magnitude, means for generating a spark retard control signal when the ramp voltage of said one sense attains said predetermined magnitude, the time period required for said ramp voltage of said one sense to attain said predetermined magnitude corresponding to an angle of rotation of said engine crankshaft of a predetermined magnitude which does not vary substantially with changes in engine speed, a plurality of engine condition responsive sensors each sensing a respective engine operating condition, each sensor providing a control signal as a function of whether an engine operating condition is above or below a predetermined value, electronic spark timing selector means coupled to said sensors and responsive to a plurality of different combinations of engine operating conditions for providing spark selection signals, means responsive to said spark selection signals for causing the engine spark timing to be controlled by said spark advance control signal when said spark timing selector means has an input representing a first predetermined combination of engine operating conditions, means responsive to said spark selection signals for causing engine spark timing to be controlled by said spark retard control signal to thereby retard spark timing when said selector means has an input representing a second combination of engine operating conditions, and means responsive to a third combination of engine operating conditions for varying the slope of said ramp voltage of said one sense to provide a spark timing value that differs from that provided in response to either said first or second combination of engine operating conditions.

3. A spark timing control system for an internal combustion engine comprising, a voltage pulse generator driven by the crankshaft of said engine having engine speed and vacuum advance mechanisms responsive respectively to engine speed and manifold vacuum for continuously generating a spark advance control signal related to engine crankshaft position by the advance functions provided respectively by said engine speed and vacuum advance mechanisms, a bidirectional ramp voltage generating means comprising an operational amplifier and a capacitor, said capacitor connected between the output and one input of said operational amplifier, said ramp voltage generating means generating a ramp voltage of one sense when said capacitor is being charged and generating a ramp voltage of an opposite sense when said capacitor is discharging, means for at times causing said ramp voltage generating means to initiate said ramp voltage of one sense substantially at the occurrence of said spark advance control signal, means for terminating said ramp voltage of said one sense and for causing the ramp voltage of said opposite sense to be generated when said ramp voltage of said one sense attains a predetermined magnitude, means for generating a spark retard control signal when said ramp voltage of said one sense reaches said predetermined magnitude, the time period required for said ramp voltage of said one sense to attain said predetermined magnitude from its initiation corresponding to an angle of rotation of said engine crankshaft of a predetermined magnitude which does not vary substantially with changes in engine speed, a plurality of engine condition responsive sensor means each sensing a respective engine operating condition, each sensor means providing signals indicative of whether an engine operating condition is above or below a predetermined value, electronic spark timing selector means coupled to said sensor means and responsive to a plurality of different combinations of engine operating conditions for providing spark selection signals, means responsive to said spark selection signals for causing the engine spark timing to be controlled by said spark advance control signal when said spark timing selector means has an input from said sensor means representing a first predetermined combination of engine operating conditions, means responsive to said spark selection signals for causing engine spark timing to be controlled by said spark retard control signal when said selector means has an input from said sensor means representing a second combination of engine operating conditions, and means for varying the slope of said ramp voltage of said one sense to provide a spark timing value that differs from that provided in response to either of said first or second combination of engine operating conditions when said selector means has an input from said sensor means representing a third combination of engine operating conditions.

4. A spark timing control system for an internal combustion engine comprising, a voltage pulse generator driven by the crankshaft of said engine having engine speed and vacuum advance mechanisms responsive respectively to engine speed and manifold vacuum for generating a spark advance control signal related to engine crankshaft position by the advance functions provided respectively by said engine speed and vacuum advance mechanisms, a bidirectional ramp voltage generating means, means for at times causing said ramp voltage generating means to initiate a ramp voltage of one sense substantially at the occurrence of said spark advance control signal, means for terminating said ramp voltage of said one sense and for causing said ramp voltage generating means to initiate a ramp voltage of an opposite sense when said ramp voltage of said one sense attains a predetermined magnitude, means for generating a spark retard control signal when said ramp voltage of said one sense attains said predetermined magnitude, the time required for said ramp voltage of said one sense to attain said predetermined magnitude from its initiation corresponding to an angle of rotation of said engine crankshaft of a predetermined magnitude which does not vary substantially with changes in engine speed, at least first, second and third switching means responsive respectively to engine speed, engine manifold vacuum and engine temperature, the state of operation each switching means being determined by whether an engine operating condition is above or below a predetermined value, electronic spark timing selector means coupled to said switching means and responsive to a plurality of different combinations of states of operation of said switching means for providing spark selection signals, means responsive to said spark selection signals for causing engine spark timing to be controlled by said spark advance control signal when said spark timing selector means has an input from said switching means representing a first predetermined combination of engine operating conditions, means responsive to said spark selection signals for causing engine spark timing to be controlled by said spark retard control signal when said selector means has an input from said switching means representing a second combination of engine operating conditions, and means for varying the slope of said ramp voltage of said one sense to provide a spark timing value that differs from that provided in response to either said first or second combination of engine operating conditions when said selector means has an input from said switching means representing a third combination of engine operating conditions.

5. A spark timing system for an internal combustion engine comprising, a voltage pulse generator driven by the crankshaft of said engine for generating a crankshaft position voltage which represents engine crankshaft position, centrifugal advance means responsive to engine speed for continuously phase shifting said crankshaft position voltage, vacuum advance means responsive to engine manifold vacuum for continuously phase shifting said crankshaft position voltage, said centrifugal and vacuum advance means providing continuously variable spark advance functions more advanced than desirable for certain conditions of engine operation, spark timing control means for generating a spark timing control signal either at substantially the time of occurrence of a predetermined voltage transition of said crankshaft position voltage as determined by said centrifugal and vacuum advance means or at either of at least first or second spark retards corresponding respectively to predetermined timing values that are retarded by predetermined crankshaft angles of rotation from the occurrence of said voltage transition, said spark timing control means comprising bidirectional ramp voltage generating means, an electronic spark selection logic network having an output coupled to said spark timing control means for determining the spark timing mode of operation, at least first, second, third and fourth switching means responsive respectively to engine speed, engine manifold vacuum, a first engine coolant temperature and a second engine coolant temperature of a higher value coupled to the input of said spark selection network, the state of operation of each switching means being determined by whether a corresponding engine operating condition is above or below a predetermined value, said spark selection logic network and said switching means being so arranged that the simultaneous occurrence of a first predetermined combination of states of operation of said switching means causes said spark timing to be controlled by said crankshaft position voltage, operative during a second combination of states of operation of said switching means to provide said first spark retard and operative during a third combination of states of operation of said switching means to cause said second spark retard.

6. A spark timing system for an internal combustion engine comprising, a voltage pulse generator including a pick-up coil and a rotor driven by the crankshaft of said engine for generating a crankshaft position voltage which represents engine crankshaft position, centrifugal advance means responsive to engine speed for continuously phase shifting said crankshaft position voltage, vacuum advance means responsive to engine manifold vacuum for continuously phase shifting said crankshaft position voltage, said centrifugal and vacuum advance means providing continuously variable spark advance functions more advanced than desirable for certain conditions of engine operation, spark timing control means for generating a spark timing control signal either at substantially the time of occurrence of a predetermined voltage transition of said crankshaft position voltage as determined by said centrifugal and vacuum advance means or at either of at least first or second spark retards corresponding respectively to predetermined timing values that are retarded by predetermined crankshaft angles of rotation from the occurrence of said voltage transition, said spark timing control means comprising bidirectional ramp voltage generating means including an operational amplifier and a capacitor connected between the output of the amplifier and one input of the amplifier, an electronic spark selection logic network comprising a plurality of condutors connected by a plurality of diodes in a predetermined configuration and having an output coupled to said spark timing control means for determining the spark timing mode of operation, at least first, second, third and fourth switching means responsive respectively to engine speed, engine manifold vacuum, a first engine coolant temperature and a second engine coolant temperature of a higher value coupled to the input of said spark selection logic network, the state of operation of each switching means being determined by whether a corresponding engine operating condition is above or below a predetermined value, said spark selection logic network and said switching means being so arranged that the simultaneous occurrence of a first predetermined combination of states of operation of said switching means causes said spark timing to be controlled by said crankshaft position voltage, operative during a second combination of states of operation of said switching means to provide said first spark retard and operative during a third combination of states of operation of said switching means to cause said second spark retard.

7. A spark timing system for an internal combustion engine comprising, a voltage pulse generator driven by the crankshaft of said engine for generating a crankshaft position voltage which represents engine crankshaft position, centrifugal advance means responsive to engine speed for continuously phase shifting said crankshaft position voltage, vacuum advance means responsive to engine manifold vacuum for continuously phase shifting said crankshaft position voltage, said centrifugal and vacuum advance means providing continuously variable spark advance functions more advanced than desirable for certain conditions of engine operation, spark timing control means for generating a spark timing control signal either at substantially the time of occurrence of a predetermined voltage transition of said crankshaft position voltage as determined by said centrifugal and vacuum advance means or at either of at least first or second spark retards corresponding respectively to predetermined timing values that are retarded by predetermined crankshaft angles of rotation from the occurrence of said voltage transition, said spark timing control means comprising a bidirectional ramp voltage generating means including an operational amplifier and a capacitor connected between the output of said amplifier and one input of the amplifier, said spark timing control means having a circuit bypassing said operational amplifier for at times providing said spark timing control signal substantially at the occurrence of said voltage transition when such spark timing operation is desired, an electronic spark selection logic network having an output coupled to said spark timing control means for determining the spark timing mode of operation, at least first, second, third and fourth switching means responsive respectively to engine speed, engine manifold vacuum, a first engine coolant temperature and a second engine coolant temperature of a higher value coupled to the input of spark selection network, the state of operation of each switching means being determined by whether a corresponding engine operating condition is above or below a predetermined value, said spark selection logic network and said switching means being so arranged that the simultaneous occurrence of a first predetermined combination of states of operation of said switching means causes said spark timing to be controlled by said crankshaft position voltage, operative during a second combination of states of operation of said switching means to provide said first spark retard and operative during a third combination of states of operation of said switching means to cause said second spark retard.

8. A spark timing system for an internal combustion engine comprising, a voltage pulse generator having a single pickup coil and a rotor driven by the crankshaft of said engine for generating a crankshaft position voltage which represents engine crankshaft position, centrifugal advance means responsive to engine speed for continuously phase shifting said crankshaft position voltage, vacuum advance means responsive to engine manifold vacuum for continuously phase shifting said crankshaft position voltage, said centrifugal and vacuum advance means providing continuously variable spark advance functions more advanced than desirable for certain conditions of engine operation and operative to provide the maximum spark advance for said system from an initial spark advance setting, spark timing control means for generating a spark timing control signal either at substantially the time of occurrence of a predetermined voltage transition of said crankshaft position voltage as determined by said centrifugal and vacuum advance means or at either of at least first or second spark retards corresponding respectively to predetermined timing values that are retarded by predetermined crankshaft angles of rotation from the occurrence of said voltage transition, said spark timing control means comprising bidirectional ramp voltage generating means including an operational amplifier and a capacitor connected between the output of the amplifier and one input of the amplifier, an electronic spark selection logic network having an output coupled to said spark timing control means for determining the spark timing mode of operation, a plurality of switching means, each switching means responsive to a respective engine operating condition, the state of operation of each switching means being determined by whether a corresponding engine operating condition is above or below a predetermined value, said switching means coupled to the input of said spark selection logic network, said spark selection logic network and said switching means being so arranged that the simultaneous occurrence of a first predetermined combination of states of operation of said switching means causes said spark timing to be controlled by said crankshaft position voltage, operative during a second combination of states of operation of said switching means to provide said first spark retard and operative during a third combination of states of operation of said switching means to cause said second spark retard.

* * * * *